United States Patent [19]

Nishio

[11] 4,007,539
[45] Feb. 15, 1977

[54] METHOD OF CLAMPING A LATTICE-LIKE CERAMIC STRUCTURE BODY

[75] Inventor: Shinji Nishio, Komaki, Japan

[73] Assignee: NGK Spark Plug Co., Ltd., Nagoya, Japan

[22] Filed: Apr. 7, 1976

[21] Appl. No.: 674,488

[30] Foreign Application Priority Data

Apr. 11, 1975 Japan .............................. 50-44567

[52] U.S. Cl. ........................... 29/455 R; 29/157 R; 29/526; 23/288 FC
[51] Int. Cl.² ................... B21D 39/00; B23P 19/04
[58] Field of Search ................ 29/157 R, 455, 526; 23/288 FC

[56] References Cited

UNITED STATES PATENTS

| | | | |
|---|---|---|---|
| 2,742,437 | 4/1956 | Houdry | 23/288 FC UX |
| 3,453,718 | 7/1969 | Bates | 29/455 X |
| 3,692,497 | 9/1972 | Keith et al. | 29/455 UX |
| 3,938,232 | 2/1976 | Noda et al. | 29/157 R |
| 3,959,865 | 6/1976 | Close et al. | 29/157 R |
| 3,978,567 | 9/1976 | Riley | 29/157 R |

Primary Examiner—Charlie T. Moon
Attorney, Agent, or Firm—Stevens, Davis, Miller & Mosher

[57] ABSTRACT

A lattice-like ceramic structural body having a cylindrical form in contour and a lattice form in section defined by a pair of parallel wall groups crossing perpendicular with each other is clamped through a damping member by a casing without subjecting a clamping force to portions at which two planes passing through a center line of the structural body and inclined from the wall groups by an angle of about 45°, respectively, are intersected with the outer peripheral wall of the structural body.

6 Claims, 3 Drawing Figures

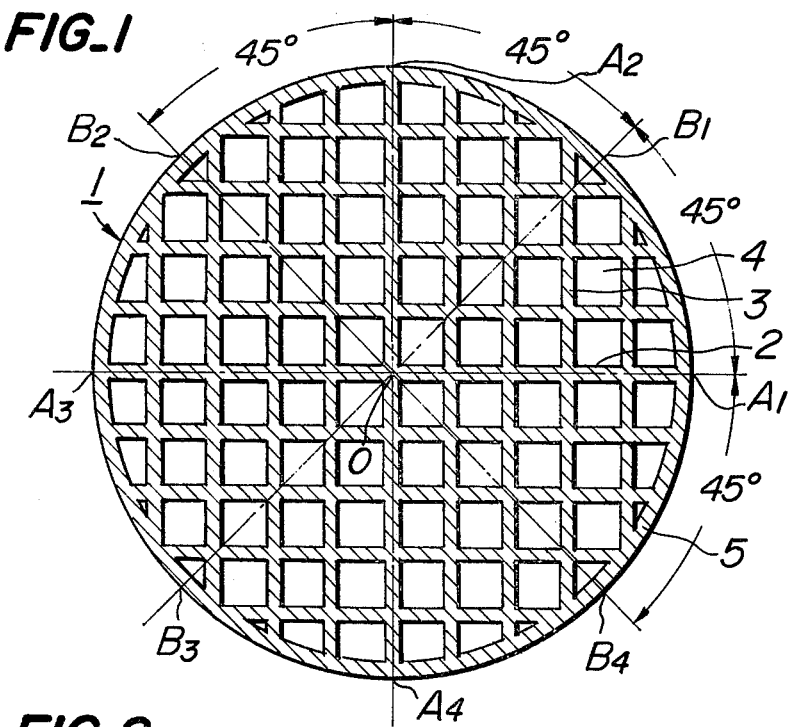
FIG_1
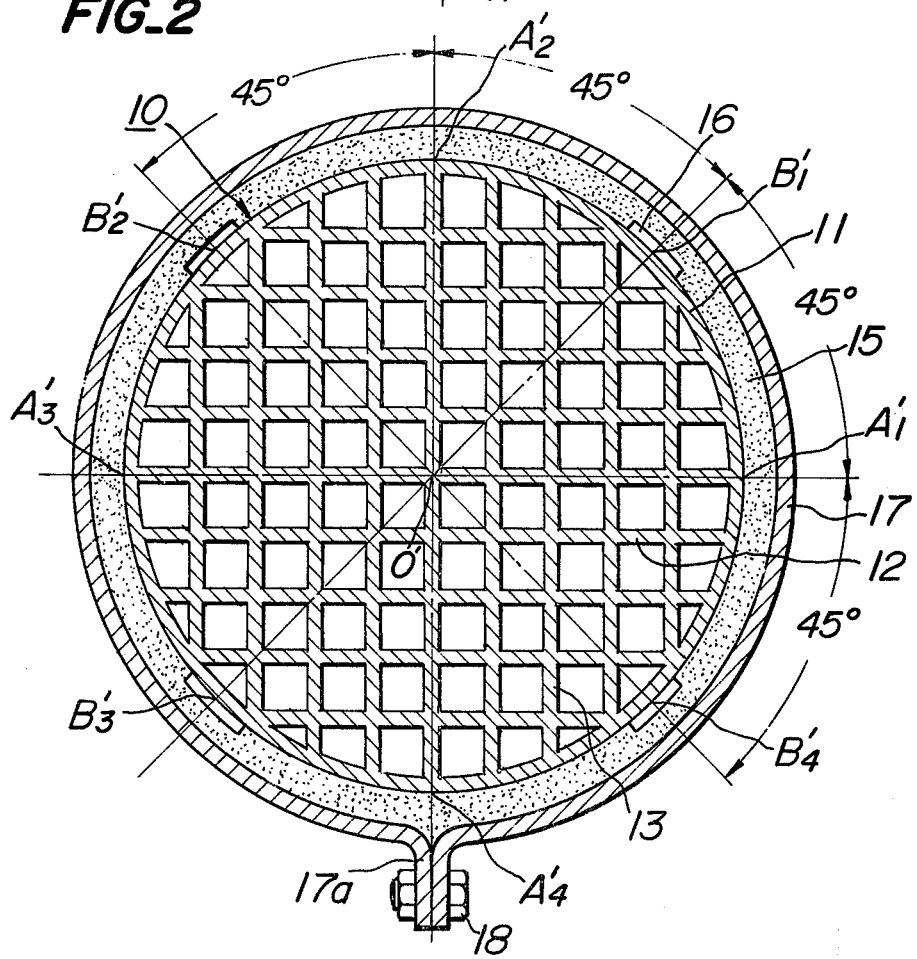
FIG_2

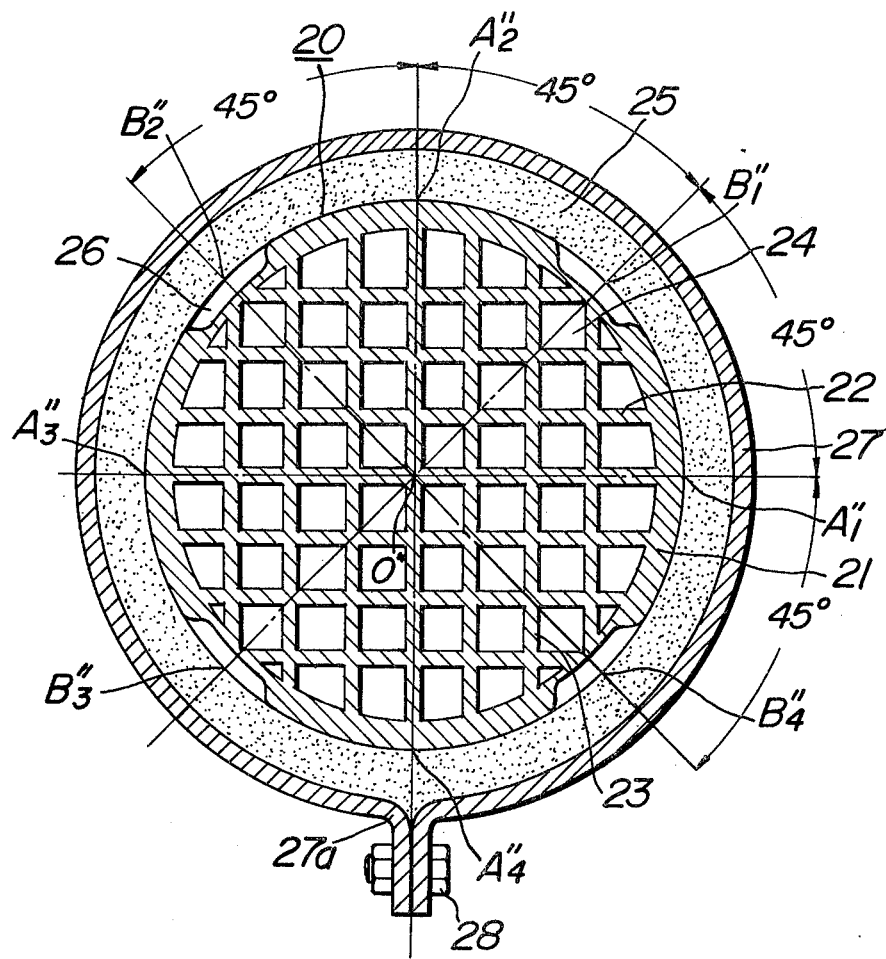

METHOD OF CLAMPING A LATTICE-LIKE CERAMIC STRUCTURE BODY

BACKGROUND OF THE INVENTION

1. Field of the Invention:

This invention relates to an improvement for a method of clamping a lattice-like ceramic structural body for catalytic convertor and the like, which is substantially cylindrical in contour and a substantially uniform lattice in section, said lattice having a member of square holes formed by a pair of parallel wall groups crossing perpendicular with each other and extending in lengthwise direction of the structural body.

2. Description of the Prior Art:

Hitherto, the structural body of this type has been clamped by a casing of catalytic convertor, deodrizer and the like through a damping member. However, a clamping force is equally applied on the structural body from the outer periphery thereof, so that the breaking of the structural body is frequently caused during the assembling or in the use.

The inventor has made various studies on such breaking phenomenon and as a result, found out that in the clamping of the structural body, the breaking strength in a direction parallel to the wall groups is considerably higher than that in a direction of 45° to the wall groups.

SUMMARY OF THE INVENTION

An object of the invention is to solve the drawback of the prior art and to provide a method of clamping the structural body based on the above mentioned knowledge.

According to the invention, there is provided a method of clamping a lattice-like ceramic structural body, which is substantially cylindrical in contour and a substantially uniform lattice in section, said lattice having a number of square holes formed by a pair of parallel wall groups crossing perpendicular with each other and extending in lengthwise direction of the structural body through a damping member by a casing, which comprises clamping the structural body without subjecting a clamping force to portions at which two planes passing through a center line of the structural body and inclined from the wall groups by an angle of about 45°, respectively, are intersected with the outer peripheral wall of the structural body.

BRIEF DESCRIPTION OF THE DRAWINGS

The invention will now be described in greater detail with reference to the accompanying drawings, wherein:

FIG. 1 is a cross sectional view of an embodiment of a lattice-like ceramic structural body;

FIG. 2 is a cross sectional view of an embodiment of the lattice-like ceramic structural body in clamped state according to the invention; and FIG. 3 is a cross sectional view of another embodiment of the lattice-like ceramic structural body in clamped state according to the invention.

DETAILED DESCRIPTION OF THE PREFERRED EMBODIMENTS

Referring to FIG. 1, numeral 1 represents a lattice-like ceramic structural body applicable to the invention, which is substantially cylindrical in contour and a substantially uniform lattice in section. This lattice has a number of square holes 4 formed by a pair of parallel wall groups 2 and 3 crossing perpendicular with each other. These holes 4 extend in lengthwise direction of the structural body 1.

In the conventional clamping of the structural body made of cordierite and having an outer diameter of 30 mm and a length of 40 mm, wherein the thickness of each of the wall groups 2 and 3 is 0.4 mm and the inner size of the hole 4 is 1.5 × 1.5 mm, the breaking strength is measured as follows.

In FIG. 1, symbols $A_1$–$A_4$ represent intersected portions of the outer peripheral wall 5 with two planes of the wall groups 2 and 3 passing through a center line 0 of the structural body, respectively, while symbols $B_1$–$B_4$ represent intersected portions of the outer peripheral wall 5 with two planes passing through the center line 0 of the structural body and inclined from the wall groups by an angle of 45°, respectively.

Firstly, a cardboard was placed into each of the intersected portions $A_2$ and $A_4$ at a width of 10 mm (i.e., over a peripheral length of 38° to the center line) and a length of 40 mm and then a force was vertically applied on these portions from the outer periphery thereof, whereby a breaking strength in $A_2$–$A_4$ direction was measured. Similarly, breaking strengths in $A_1$–$A_3$, $B_1$–$B_3$ and $B_2$–$B_4$ directions were measured. As a result, the breakings in the $A_2$–$A_4$, $A_1$–$A_3$, $B_2$–$B_4$ and $B_1$–$B_3$ directions were caused at 360 Kg, 380 Kg, 35 Kg and 40 Kg, respectively. In other words, the breaking strength in the $B_2$–$B_4$ or $B_1$–$B_3$ direction is considerably lower on the order of about tenth than that in the $A_2$–$A_4$ or $A_1$–$A_3$ direction.

Accordingly, in order to prevent the breaking of the structural body, it is necessary to clamp the structural body without subjecting a clamping force to portions at which two planes passing through the center line of the structural body and inclined from the wall groups by about 45°, respectively, are intersected with the outer peripheral wall of the structural body, because these portions are apt to cause the breaking as mentioned above.

According to the invention, therefore, there is adopted a means for clamping the lattice-like ceramic structural body so as not to subject a clamping force to intersected portions of the outer peripheral wall with two planes passing through the center line of the structural body and inclined from the wall groups by an angle of about 45°.

FIG. 2 shows an embodiment of the lattice-like ceramic structural body according to the invention in clamped state. That is, the lattice-like ceramic structural body 10 is substantially cylindrical in contour and a substantially uniform lattice in section like the structural body shown in FIG. 1. This lattice has a number of square holes 14 formed by a pair of parallel wall groups 12 and 13 crossing perpendicular with each other. These holes 14 extend in lengthwise direction of the structural body 10.

In order to clamp the structural body 10 by a casing 17, a damping member 15 is inserted between the outer peripheral wall 11 of the structural body 10 and the casing 17. As the damping member 15, use may be made of braided layer of a heat-resistant metallic wire such as stainless steel and the like; ceramic shaped articles such as asbestos, glass wool and the like; a corrugated plate of a heat-resistant metal and the like. In the damping member 15 there are provided grooves 16 at $B'_1$–$B'_4$ portions corresponding to the $B_1$–$B_4$ portions shown in FIG. 1, which extend in lengthwise direction of the damping member 15. These $B'_1$–$B'_4$ portions mean intersections of the outer peripheral wall 11 with two planes passing through the center line 0' of the structural body 10 and inclined from the wall groups 12 and 13 by an angle of 45°. Alternatively, the grooves 16 may be provided on the casing 17 instead of the damping member 15.

The lattice-like ceramic structural body 10 is clamped through the damping member 15 by the casing 17, for instance, by fastening bolts 18 through ridges 17a of the casing 17. Thus, a clamping force is not subjected to the $B'_1$–$B'_4$ portions of the structural body 10 owing to the presence of the grooves 16, so that the breaking of the structural body 10 is hardly caused.

If the structural body 10 is moved by vibration, shock or the like after the assembling of the structural body 10, the grooves 16 are out of the positions corresponding to the $B'_1$–$B'_4$ portions of the outer peripheral wall 11, so that the clamping force is subjected to the $B'_1$–$B'_4$ portions so as to be apt to cause the breaking of the structural body 10.

Therefore, it is desirable that at least one protrusion is provided on the outer peripheral wall 11 of the structural body 10 in order to prevent the rotation of the damping number 15 relative to the structural body 10.

In FIG. 3, there is shown another embodiment of the lattice-like ceramic structural body according to the invention in clamped state. In this embodiment, the lattice-like ceramic structural body 20 has the same structure as shown in FIGS. 1 and 2, except that the thickness of the outer peripheral wall 21 is ununiform. That is, the thickness of the outer peripheral wall 21 is reduced at $B''_1$–$B''_4$ portions defined by intersection of the outer peripheral wall with two planes passing through a center line O'' of the structural body 20 and inclined from wall groups 22 and 23 by an angle of 45°, which correspond to the $B_1$–$B_4$ portions shown in FIG. 1.

The lattice-like ceramic structural body 20 is clamped through a damping member 25 by a casing 27, for instance, by fastening bolts 28 through ridges 27a of the casing 27.

Thus, grooves 26 are formed between the outer peripheral wall 21 and the damping member 25 in the clamping of the structural body 20, so that the clamping force is not subjected to the $B''_1$–$B''_4$ portions likewise the case of FIG. 2. Consequently, the breaking of the structural body 20 is hardly caused.

As mentioned above, according to the invention, an escape for the clamping force is provided on the outer peripheral wall of the structural body or the damping member or the casing at positions corresponding to intersected portions of the outer peripheral wall with two planes passing through the center line of the structural body and inclined from parallel wall groups by an angle of about 45°, whereby the clamping force is not subjected to these portions, so that the breaking of the structural body can be prevented completely. That is, the clamping method according to the invention is remarkably valuable in practice.

What is claimed is:

1. In a method of clamping a lattice-like ceramic structural body, which is substantially cylindrical in contour and a substantially uniform lattice in section, said lattice having a number of square holes formed by a pair of parallel wall groups crossing perpendicular with each other and extending in lengthwise direction of said structural body, through a damping member by a casing, an improvement which comprises clamping said structural body without subjecting a clamping force to portions at which two planes passing through a center line of said structural body and inclined from said wall groups by an angle of about 45°, respectively, are intersected with the outer peripheral wall of said structural body.

2. A method as claimed in claim 1, wherein in said damping member are provided grooves at positions corresponding to said portions.

3. A method as claimed in claim 1, wherein in said casing are provided grooves at positions corresponding to said portions.

4. A method as claimed in claim 1, wherein the thickness of said outer peripheral wall is reduced at positions corresponding to said portions so as to form grooves with said damping member.

5. A method as claimed in claim 1, wherein said damping member is selected from the group consisting of braided layer of a heat-resistant metallic wire, a ceramic shaped article and a corrugated plate of a heat-resistant metal.

6. A method as claimed in claim 2, wherein on said outer peripheral wall is provided at least one protrusion so as to prevent rotation of said damping member relative to said structural body.

* * * * *